Sept. 2, 1947.    H. GREENBERG    2,426,678
REVIVIFICATION OF PHOSPHATE CATALYSTS
Filed April 27, 1943
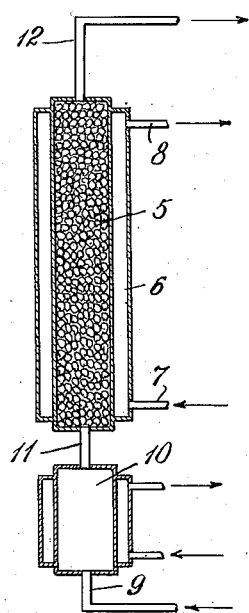
INVENTOR.
Harry Greenberg
BY
ATTORNEYS Patented Sept. 2, 1947

2,426,678

UNITED STATES PATENT OFFICE 2,426,678

REVIVIFICATION OF PHOSPHATE CATALYSTS

Harry Greenberg, Stamford, Conn., assignor to U. S. Industrial Chemicals, Inc., New York, N. Y., a corporation of Delaware Application April 27, 1943, Serial No. 484,702

6 Claims. (Cl. 252—242)

This invention relates to the production of 1,3-butadiene from 1,3-butylene glycol and particularly to an improved method of revivifying phosphate catalysts employed in the dehydration reaction.

1,3-butadiene is derived from 1,3-butylene glycol by splitting off water in accordance with the following reaction:

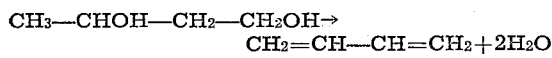

$$CH_3\text{—}CHOH\text{—}CH_2\text{—}CH_2OH \rightarrow CH_2\text{=}CH\text{—}CH\text{=}CH_2 + 2H_2O$$

The dehydration of 1,3-butylene glycol is effected in the presence of a catalyst. Sodium acid phosphate and calcium phosphate have been suggested as catalysts, and magnesium pyrophosphate may also be used. The application of Arthur E. Lorch, Serial No. 483,343 filed April 16, 1943, describes an improved method of dehydrating 1,3-butylene glycol employing as a catalyst ammonium phosphate mounted on a support consisting principally of silica, such for example as calcined diatomaceous earth, generally known as "Celite V," or silica bonded with feldspar.

Phosphate catalysts employed in this reaction have at best a relatively short active life. The catalysts become inactive apparently as the result of deposition of carbonaceous matter and as the result of various other changes which occur. Heretofore reactivation of the catalyst has been effected to some extent by burning off the carbonaceous matter in the presence of air or oxygen. This procedure frequently fails to restore the catalyst to a sufficiently active condition to warrant its continued use.

It is the object of the present invention to afford a simple, effective and inexpensive procedure whereby phosphate catalysts may be restored or reactivated after they have deteriorated in use, thus materially decreasing the cost of the dehydration reaction as applied to 1,3-butylene glycol.

Other objects and advantages of the invention will be apparent as it is better understood by reference to the following specification and the accompanying drawing, illustrating diagrammatically an apparatus suitable for the practice of the invention.

I have discovered that spent phosphate catalysts may be revivified by introducing thereto at the temperature normally employed in the dehydration reaction, a volatile ester of phosphoric acid. The volatile ester employed should be one which is decomposed at the temperature employed, and it must be capable of being volatilized below the decomposition temperature. Numerous volatile esters of phosphoric acid having the desired properties are available, including trimethyl phosphate, triethyl phosphate, tripropyl phosphate and tributyl phosphate. These are merely the preferred compounds which may be utilized in the practice of the invention, though others may be employed. The ester of phosphoric acid is decomposed in contact with the catalyst, affording thereby a source of free phosphoric acid.

While the invention may be applied to phosphate catalysts in general, it is particularly useful in connection with the catalysts described in the application of Arthur E. Lorch above identified. In accordance with the disclosure of that application, butadiene can be produced advantageously by passing 1,3-butylene glycol in the vapor phase over an improved catalyst mass which is adapted to withstand the disintegrating effect of free phosphoric acid. In the procedure the catalyst body is maintained preferably at a temperature ranging from 220° to 400° C., the most effective range for the catalyst described being approximately 280° to 320° C. The temperature may be maintained by circulating a suitable heating medium such for example as a mixture of diphenyl and diphenyl oxide known as "Dowtherm" about the catalyst body.

The preferred catalyst is "ammonium phosphate." The term ammonium phosphate is employed as a general designation of the tri, di and mono ammonium phosphates or mixtures of these salts. It is employed also to include decomposition products of these phosphates which are subject to modification when subjected to temperatures such as those employed in the method. The precise composition of the resultant salt or salts in the catalyst mass at the temperature maintained cannot be determined accurately. Any of the phosphates mentioned or the resulting products are active catalysts for the reaction.

In order to attain the most effective use of "ammonium phosphate" as a catalyst for the reaction, it is desirable to mount it on a suitable support. Silica in the form of a calcined diatomaceous earth known as "Celite V" or silica bonded with feldspar is preferred, and affords a satisfactory support for "ammonium phosphate" in catalyst masses to be employed for the purpose of the present invention.

The proportion of "ammonium phosphate" in the catalyst body may be varied over wide limits. It will depend in part upon the degree and type of porosity of the supporting material as well as the size of the pieces of support. Satisfactory catalysts have been prepared covering the range of 10% to 60% by weight of "ammonium phosphate."

The size of the individual pieces of catalyst body may be varied within wide limits to secure optimum contact with the reactant gases.

Whether the catalyst is sodium acid phosphate, calcium phosphate, magnesium pyrophosphate, or "ammonium phosphate" it will, after a period of use, become contaminated with carbonaceous matter and otherwise will lose its activity. To revivify the catalyst either before or after it is subjected to burning off of the carbonaceous matter, I introduce to the catalyst, preferably without removing it from the catalyst chamber, a volatile ester of phosphoric acid such as one of the esters hereinbefore mentioned. The ester may be introduced, for example, with the 1,3-butylene glycol during continued operation of the dehydration reaction, or it may be introduced independently with steam or an inert gas such as nitrogen. In any event, the phosphoric acid ester is passed through the catalyst body while the temperature is maintained at approximately that employed in the dehydration reaction for a sufficient period to attain the desired result.

Thereafter the temperature of the catalyst body may be raised to a temperature of 300°–450° C., and the carbonaceous material can be removed by passing air, preferably saturated with water vapor at 70°–80° C., through the catalyst until little or no carbon dioxide can be detected in the exit gases. As indicated, the burning off procedure may precede the introduction of the phosphoric acid ester.

To complete the revivification of the catalyst, ammonia is introduced either with the glycol or with steam or an inert gas such as nitrogen. Commercial concentrated ammonia solution (approximately 28% NH3 by weight) or liquid ammonia may be used. Preferably 1 to 2 parts by weight based on 100 parts of anhydrous 1,3-butylene glycol are used, but the proportions may vary widely. After an appropriate interval, which will vary markedly depending upon the condition of the catalyst, its activity will be found to have been substantially restored.

The procedure will be better understood by reference to the drawing illustrating the preferred form of apparatus. Details with respect to the separation and recovery of butadiene and the return of unreacted or partially reacted products to the reaction are eliminated for the purpose of clarity. Referring to the drawing, the catalyst mass is disposed in a chamber 5 having a jacket 6. The heating liquid at the desired temperature may be introduced through a pipe 7 and withdrawn through a pipe 8. The 1,3-butylene glycol is introduced through a pipe 9 to a vaporizer 10 which may be heated in any suitable manner. The vapor is delivered by a pipe 11 to the chamber 5, and the resulting products are withdrawn through a pipe 12. It will be understood that the vapors withdrawn through the pipe 12 may be subjected to any suitable treatment to recover butadiene therefrom and to return unreacted or partially reacted glycol to the operation.

The volatile phosphoric acid ester may be introduced either with the glycol through the pipe 9 or it may be introduced independently with steam or an inert gas and passed through the catalyst body. Likewise, when it is necessary to burn off the catalyst, air, preferably saturated with water vapor at 70°–80° C., may be introduced similarly through the pipe 9. During the burning off operation, the temperature of the catalyst body will be raised by increasing the temperature of the fluid circulating through the jacket 6. As already indicated, ammonia can be supplied with the glycol or independently as desired. All of the necessary operations to dehydrate 1,3-butylene glycol and to revivify the catalyst in accordance with the present invention may be conducted without removing the catalyst body from the chamber 5.

The effect of the method on the catalyst is indicated by the following examples:

Example I

Approximately 300 cc. of a catalyst consisting of 70% "Celite V" and 30% "ammonium phosphate" was used in the vapor phase dehydration of 1,3-butylene glycol until the conversion to 1,3-butadiene had decreased to 19%. Triethyl phosphate was then added to the feed of butylene glycol in the ratio of 2 parts to 100 parts of butylene glycol. The mixture was passed through the spent catalyst at the normal rate of 25–35 grams of butylene glycol per hour at 300°–320° C., for two and one-half days. The conversion rate had then risen to 70%. The catalyst was then burned off with air saturated with moisture at 70°–80° C. for a period of two days at about 400° C. The original feed of 1,3-butylene glycol containing ammonia was restored and the operation continued at 300°–320° C. The conversion for the next eight days was within the range of 72%–60%.

Example II

A catalyst similar to that described in Example I was operated until the conversion had decreased to 38%. It was then burned off with air as in Example I and subsequently subjected to the vapors of a 1% solution of triethyl phosphate in 1,3-butylene glycol for a period of two days at 300°–320° C. At the end of this period the conversion had risen to 65%. The normal feed of 1,3-butylene glycol containing ammonia was then resumed, and the conversion remained at 70%–60% for three days.

Example III

A catalyst composed of magnesium pyrophosphate was operated with intermittent burning off of carbonaceous deposits until the conversion dropped over a two-day period from about 40% to about 20%. The catalyst was then treated with the vapors of a solution of .1% triethyl phosphate in 1,3-butylene glycol, and the conversion increased to a maximum of about 60%, decreasing after about 10 days to 40%. The catalyst was then burned off and the normal feed of 1,3-butylene glycol was resumed. The conversion rose to 62% and after nine days of operation was still at 30%.

As indicated by the examples, the order of treatment of the catalyst with respect to burning off and the introduction of a volatile phosphoric acid ester is unimportant. The phosphoric acid ester does not affect the carbonaceous material in the catalyst, nor is it affected by the burning off operation by which the carbonaceous deposits are removed. It is possible to vary the procedure and secure the desired results, which depend upon the introduction of free phosphoric acid to the catalyst mass.

Although the invention is particularly useful in the revivification of spent catalysts, the procedure may be employed with equal facility to deposit "ammonium phosphate" on a suitable support. The latter may be disposed in the catalyst chamber and treated successively with a volatile ester of phosphoric acid and ammonia or glycol containing ammonia. The appended claims comprehend such an operation.

Various changes may be made in the form and arrangement of the apparatus and in the procedure as described without departing from the invention or sacrificing the advantages thereof.

I claim:

1. In the method of revivifying spent solid dehydration phophate catalysts in which method carbonaceous deposits are removed by combustion with oxygen, the steps which comprise passing over the catalyst a volatilized ester of phosphoric acid which is stable at its volatilization temperature, and maintaining the catalyst at a temperature at which the ester is decomposed to deposit free phosphoric acid.

2. In the method of revivifying spent solid dehydration phosphate catalysts in which method carbonaceous deposits are removed by combustion with oxygen, the steps which comprise maintaining the catalyst at a temperature within the range of 220° to 400° C., and passing over the catalyst a volatilized ester of phosphoric acid which is stable at its volatilization temperature and is decomposed to deposit free phosphoric acid at the temperature at which the catalyst is maintained.

3. The method of revivifying spent solid dehydration phosphate catalysts which comprises removing carbonaceous deposits from the catalyst by combustion with oxygen, thereafter passing over the catalyst a volatilized ester of phosphoric acid which is stable at its volatilization temperature, and maintaining the catalyst at a temperature at which the ester is decomposed to deposit free phosphoric acid.

4. The method of revivifying spent solid dehydration phosphate catalysts which comprises removing carbonaceous deposits from the catalyst by combustion with oxygen, thereafter maintaining the catalyst at a temperature within the range of 220° to 400° C., and passing over the catalyst a volatilized ester of phosphoric acid which is stable at its volatilization temperature and which is decomposed during the revivification to deposit free phosphoric acid onto the cataylst.

5. In the method of revivifying spent ammonium phosphate catalysts in which carbonaceous deposits are removed during the method, the steps which comprise passing over the catalyst a volatilized ester of phosphoric acid which is stable at its volatilization temperature, maintaining the catalyst at a temperature at which the ester is decomposed to deposit free phosphoric acid, and thereafter passing ammonia over the catalyst.

6. In the method of revivifying spent ammonium phosphate catalysts in which method carbonaceous deposits are removed, the steps which comprise maintaining the catalyst at a temperature within the range of 220° to 400° C., passing over the catalyst a volatilized ester of phosphoric acid which is stable at its volatilization temperature and which is decomposed during the revivification to deposit free phosphoric acid onto the catalyst, and thereafter passing ammonia over the catalyst.

HARRY GREENBERG.

REFERENCES CITED

The following references are of record in the file of this patent:

UNITED STATES PATENTS

| Number | Name | Date |
| --- | --- | --- |
| 2,237,866 | Guinot | Apr. 8, 1941 |
| 2,310,809 | Reppe | Feb. 9, 1943 |
| 2,235,166 | Pyzel | Mar. 18, 1941 |
| 2,161,392 | Stevens | June 6, 1939 |
| 2,364,970 | Gwynn | Dec. 12, 1944 |

FOREIGN PATENTS

| Number | Country | Date |
| --- | --- | --- |
| 450,592 | Great Britain | July 20, 1936 |
| 340,513 | Great Britain | Dec. 22, 1930 |
| 100,734 | Australia | Apr. 15, 1937 |